UNITED STATES PATENT OFFICE.

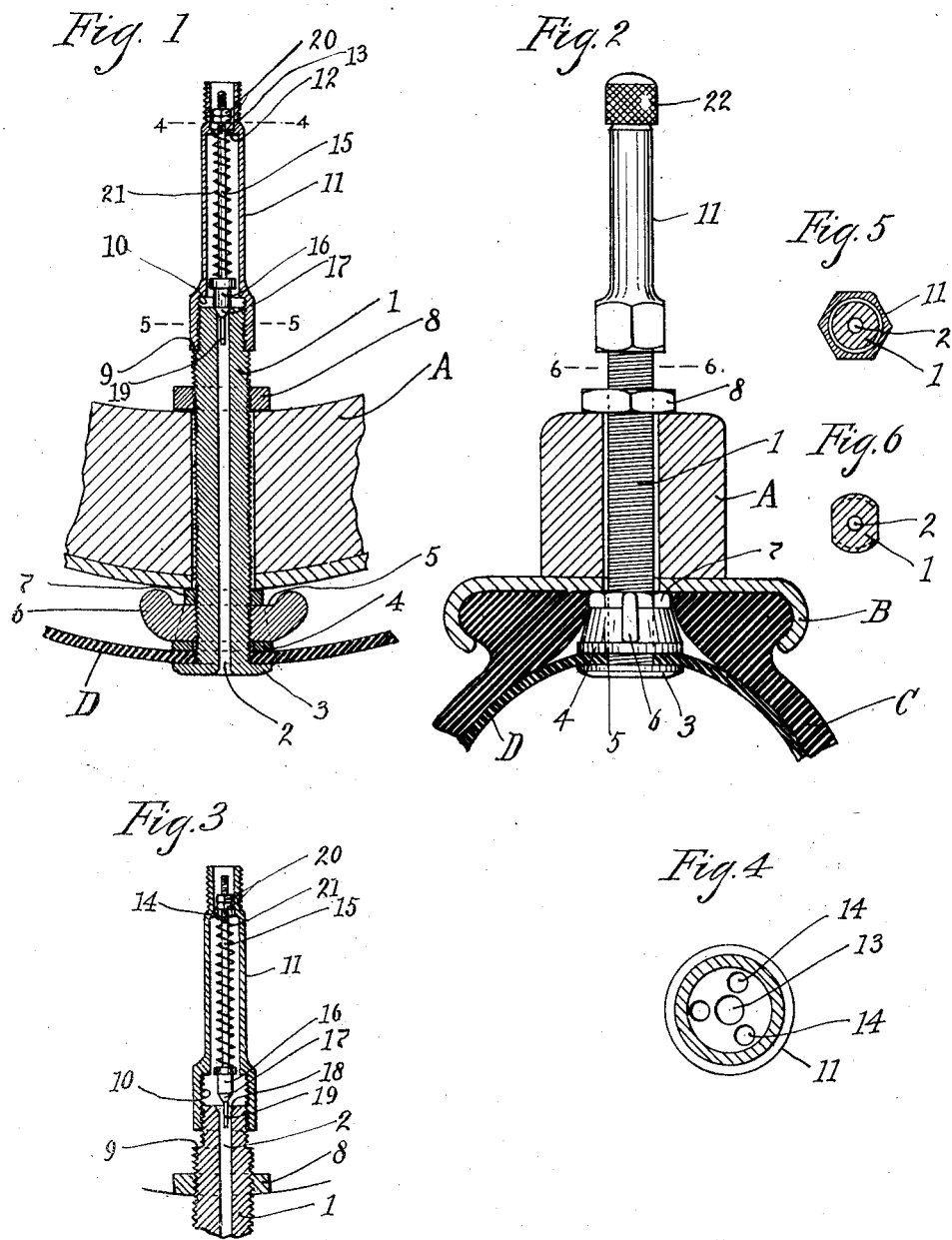
A. C. BERG.
TIRE VALVE.
APPLICATION FILED OCT. 9, 1919.
1,344,854.
Patented June 29, 1920.
Inventor.
Anton C. Berg
by H. S. Johnson
his Attorney.

ANTON C. BERG, OF WHITE BEAR, MINNESOTA.

TIRE-VALVE.

1,344,854.  Specification of Letters Patent.  Patented June 29, 1920.

Application filed October 9, 1919. Serial No. 329,531.

*To all whom it may concern:*

Be it known that I, ANTON C. BERG, a citizen of the United States, residing at White Bear, in the county of Washington and State of Minnesota, have invented certain new and useful Improvements in Tire-Valves, of which the following is a specification.

This invention relates to tire valves and has for its object to provide improved valve mechanism whereby excessive air pressure in the tire may be relieved to avoid bursting of the latter, the mechanism being adjustable so as to render the invention applicable under all pressure conditions.

A further object of the invention is to provide in a tire valve improved connecting means whereby to connect the valve with the tube.

To this end the invention consists in the construction, combination and arrangement of parts hereinafter described and claimed. In the drawings:

Figure 1 is a vertical sectional view of the invention shown secured to the felly of an auto wheel.

Fig. 2 is a side view of the invention, the felly, wheel rim and tire casing being shown in section.

Fig. 3 is a vertical sectional view of the valve mechanism alone.

Fig. 4 is an enlarged sectional view on line 4—4 of Fig. 1.

Fig. 5 is a sectional view on line 5—5 of Fig. 1, and

Fig. 6 is a sectional view on line 6—6 of Fig. 2.

In the drawings A represents a fragment of the felly of a wheel, B the rim thereof, C a tire cover and D a portion of the inner tube.

The invention comprises an exteriorly threaded valve body 1 of uniform diameter having a central longitudinal bore 2 throughout its length. At its lower extremity the body is formed with a circular flange 3 adapted to coöperate with a washer 4 loosely slipping over the thread of the valve body to grip the inner tube between them. Threaded on the valve body and engaging the upper face of the washer 4 to press the latter against the inner tube is the thumb nut 5, the latter being formed with oppositely disposed finger pieces 6 extending from the sides thereof. A lock nut 7 likewise fitting the thread of the valve body serves to hold the thumb nut positioned. A retaining nut 8 also fitting the thread of the valve body holds the latter rigidly positioned in the felly. The upper extremity of the valve body is reduced in diameter to form the annular shoulder 9, said reduced portion being of uniform diameter and exteriorly threaded so as to fit the thread 10 of the valve casing 11, the thread thereof closely fitting the thread of said reduced portion. The valve casing is tubular in form, the upper extremity thereof being reduced in diameter and threaded exteriorly to fit the standard hose connection customarily used in inflating tires. The valve casing near its upper extremity is formed with an internal transverse wall 12, said wall having a central opening 13 and a plurality of ports 14. Fitting loosely through the bore 13 is the stem 15 preferably integral with the valve head 16, the latter being formed with a conic seat 17 adapted to fit the valve seat 18 at the top of the valve body. A longitudinal downwardly extending retaining pin 19 serves to keep the valve directed toward its seat. The valve stem 15 screw threadedly carries at its upper extremity the nuts 20, said nuts being adapted to rest on the partition wall 12 when the valve is unseated as shown in Fig. 3. Between the partition wall 12 of the valve head 16 and surrounding the stem 15 is the coil spring 21, whereby the valve head is urged constantly against its seat when the valve casing is screwed against the shoulder 9. Thus, when it is desired to inflate the tube the valve casing is to be unscrewed from the shoulder 9 until the partition 12 engages the lower face of the nuts 20 and thereby lifts the valve from its seat. Air now will pass through the ports 14 and the bore 2 into the inner tube, the thread connection between the valve casing and the valve body fitting sufficiently tight to render it practically tight against leakage. The pressure in the inner tube opposes the tension of the spring 21, the tension of the latter being changeable by means of the nuts 20. Thus, the spring may be set so as to yield only when excessive pressure is developed in the tube.

It has been found that many tubes fracture as a result of sudden impacts in the course of travel, these impacts causing periodic excessive pressures. It is at these times that the spring 21 will yield and release excessive pressure, it automatically reseating the valve. A suitable milled cap 22 fitting the thread of the reduced neck at the top of the casing renders the device dust proof. As shown in Fig. 6 opposite sides of the body member are flattened to accommodate the use of an ordinary wrench.

I claim:

1. A tire valve comprising a threaded tubular member, a tubular open top valve casing adapted to be removably screwed telescopingly on said tubular body member, a stem valve to close the end of the tubular body member, said valve being mounted in such a manner as to be held resiliently under stress in said casing to move as a unit therewith but yieldable to pressure longitudinally therein, said mounting including adjustment means on the valve stem for varying the force of said stress, said stem being projectable through said open top to expose said adjustment means to facilitate operation thereof.

2. A tire valve comprising an exteriorly threaded tubular body member having a valve seat around the opening of one end thereof, a tubular open top valve casing threadedly connected endwise with said body member so as to be screwed back and forth thereon, a valve on the valve seat having a stem extending to the top of said casing, a perforated transverse wall in said casing loosely surrounding said stem, outwardly pressing spring means extending from said valve to said wall, and a nut screw threaded on said stem above said perforated wall and resting on the latter whereby the position of the valve relative to the casing may be changed.

3. A tire valve comprising an exteriorly threaded tubular body member having a valve seat at one end, a tubular open top valve casing threadedly connected endwise with said body member so as to be screwed back and forth thereon, a valve for said seat movably mounted in said casing and moving as a unit with the latter to engage said seat, an outwardly pressing spring means extending from the valve to the casing to render the former movable vertically under stress for the purpose set forth.

In testimony whereof I affix my signature.

ANTON C. BERG.